(12) United States Patent
Wang

(10) Patent No.: US 9,884,381 B2
(45) Date of Patent: Feb. 6, 2018

(54) HIGHLY EFFICIENT, ANTI-VIBRATION, DURABLE ROTATING FILE WITH VARIABLE PITCH

(71) Applicant: Hongjia Wang, Shanghai (CN)

(72) Inventor: Hongjia Wang, Shanghai (CN)

( * ) Notice: Subject to any disclaimer, the term of this patent is extended or adjusted under 35 U.S.C. 154(b) by 0 days.

(21) Appl. No.: 15/091,737

(22) Filed: Apr. 6, 2016

(65) Prior Publication Data

US 2016/0221094 A1  Aug. 4, 2016

Related U.S. Application Data

(63) Continuation of application No. PCT/CN2015/077851, filed on Apr. 29, 2015.

(30) Foreign Application Priority Data

May 8, 2014  (CN) .................... 2014 2 0232630 U

(51) Int. Cl.
*B23D 71/00* (2006.01)
*B23C 5/10* (2006.01)

(52) U.S. Cl.
CPC .............. *B23D 71/005* (2013.01); *B23C 5/10* (2013.01); *B23C 2210/326* (2013.01)

(58) Field of Classification Search
CPC .... B23C 2210/326; B23C 5/10; B23D 71/005
See application file for complete search history.

(56) References Cited

U.S. PATENT DOCUMENTS

| | | | |
|---|---|---|---|
| 5,221,163 A * | 6/1993 | Nishimura | B23C 5/10 407/53 |
| 7,862,263 B2 * | 1/2011 | van Iperen | B23C 5/10 407/54 |
| 9,452,479 B2 * | 9/2016 | Hufschmied | B23C 5/10 |
| 2015/0251253 A1 * | 9/2015 | Hufschmied | B23B 51/08 407/29.13 |
| 2015/0290724 A1 * | 10/2015 | Sharivker | B23C 5/10 407/54 |
| 2016/0089728 A1 * | 3/2016 | Archambault | B23C 5/10 407/54 |
| 2016/0288222 A1 * | 10/2016 | Farrell | B23B 3/02 |

* cited by examiner

*Primary Examiner* — Sara Addisu
(74) *Attorney, Agent, or Firm* — Wayne & Ken, LLC; Tony Hom

(57) ABSTRACT

The present disclosure relates to a rotary burs with variable pitch. The file is made up of a cutter head (1) and a cutter handle (2). The cutter head is connected with the cutter handle. Multiple groups of cutter teeth are distributed on the cutter head. Each group of cutter teeth can be mixed cutter teeth, and can also be a single cutter tooth. The mixed cutter teeth are respectively a group of cutter teeth composed of a large tooth (3), a medium tooth (4) and a fine tooth (5) sequentially arranged, and can also be a group of mixed cutter teeth formed by combining any two of a large tooth, a medium tooth and a fine tooth.

5 Claims, 8 Drawing Sheets

HIGHLY EFFICIENT, ANTI-VIBRATION, DURABLE ROTATING FILE WITH VARIABLE PITCH

CROSS-REFERENCE TO RELATED APPLICATIONS

This application is a continuation of International Patent Application No. PCT/CN2015/077851 with an international filing date of Apr. 29, 2015, designating the United States, now pending, and further claims priority benefits to Chinese Patent Application No. 201420232630.7, filed May 8, 2014. The contents of all of the aforementioned applications, including any intervening amendments thereto, are incorporated herein by reference.

TECHNICAL FIELD

The present invention relates to a highly efficient, anti-vibration, durable rotating file with variable pitch which can be used for metallic and non-metallic sanding and cutting processing, belonging to cutters for mechanical processing.

BACKGROUND OF THE PRESENT INVENTION

A rotating file is an indispensable tool for machining of bench workers. It is widely used and has an obvious utilization effect in the industrial fields of aviation, automobiles, ships, chemical industry, machinery, handicraft carving, etc. The rotating file can replace a vitrified abrasive wheel with a handle at most of work, increase the working efficiency almost ten times and improve the durability more than 200 times. Moreover, the rotating file has no dust pollution, greatly alleviates labor intensity, improves a working environment, greatly increases economic benefits and reduces comprehensive processing cost dozens of times.

In the prior art, the rotating file already has national standards and has many types and specifications. Cutter teeth on the circumference of the head of the rotating file are arranged at equal intervals, and have equal pitch, According to the size of the pitch, the cutter teeth are successively divided into thick teeth, medium teeth and fine teeth. The thick teeth have a larger chip groove, can conduct large-allowance processing and are generally used for rough machining. Processed surface finish is rough, and the thick teeth are suitable for processing softer material. The medium teeth are frequently-used pitch and are suitable for usual processing needs. The fine teeth have dense pitch and are suitable for small-allowance processing. Processed surface finish is fine. For different processing objects and processing requirements, a rotating file with a different pitch shall be selected accordingly.

The rotating file usually needs to be used in combination with handheld power tools such as high-speed air grinder or electric grinder, and can also be used on machine tools. The rotating file belongs to a high-speed rotating tool. The utilization process thereof is a continuous (from a macroscopic perspective) and discontinuous (from a microscopic perspective) complicated cutting processing process. Because cutting force is suddenly changed when each cutter tooth cuts in and out, a structure with equal pitch causes that a system which comprises a power tool-a fixture-a cutter-a workpiece is periodically impacted, thereby generating forced vibration. The vibration will result in many adverse effects and unsafe hidden danger of breaking the cutting edge of the rotating file, increasing abrasion, shortening the service life, deteriorating the quality of a processed surface, and becoming difficult to operate and control, etc.

SUMMARY

A technical problem to be solved by the present invention is to provide a highly efficient, anti-vibration, durable rotating file with variable pitch having the characteristics of a single thick tooth, a single medium tooth and a single fine tooth, achieving the purpose of restraining forced vibration during processing and being capable of increasing processing efficiency.

The technical solution to achieve the above purpose is as follows:

A highly efficient, anti-vibration, durable rotating file with variable pitch comprises a cutter head and a cutter handle, wherein the cutter head is connected with the cutter handle. The rotating file is characterized in that: multiple groups of cutter teeth are distributed on the cutter head; each group of cutter teeth are mixed cutter teeth; each group of mixed cutter teeth comprise a large tooth, a medium tooth and a fine tooth, the large tooth, the medium tooth and the fine tooth are arranged sequentially or at intervals to form a group of mixed cutter teeth, wherein the group of cutter teeth is in the same section as the cutter head, and the sections of groups of mixed cutter teeth are arranged sequentially or at intervals in the sequence of the large tooth, the medium tooth and the fine tooth.

Alternatively, each group of mixed cutter teeth can be formed by combining any two of a large tooth, a medium tooth and a fine tooth. Each group of mixed cutter teeth on the cutter head are identical, wherein the arrangement sequence of the cutter teeth in the group of cutter teeth with the same section as the cutter head is consistent with that of the cutter teeth forming the group of cutter teeth.

The large tooth or the medium tooth or the fine tooth in each group of mixed cutter teeth is at least one. For example, the combination of each group of mixed cutter teeth can be the large tooth-the medium tooth-the fine tooth/ . . . .

Preferably, each group of cutter teeth are in the same section as the cutter head; an inclined angle between the cutter teeth and the center of the cutter head is respectively $\alpha$, wherein an inclined angle between the large tooth and the center of the cutter head is $\alpha 3$; an inclined angle between the medium tooth and the center of the cutter head is $\alpha 2$; an inclined angle between the fine tooth and the center of the cutter head is $\alpha 1$; meanwhile, $\alpha 1 < \alpha 2 < \alpha 3$; and the angle of a is between 9° to 45°.

A highly efficient, anti-vibration, durable rotating file with variable pitch comprises a cutter head and a cutter handle, wherein the cutter head is connected with the cutter handle. The rotating file is characterized in that: multiple groups of cutter teeth are distributed on the cutter head; each group of cutter teeth are mixed cutter teeth; and each group of mixed cutter teeth comprise a plurality of large teeth, a plurality of medium teeth and a plurality of fine teeth.

A plurality of large teeth are arranged sequentially or at intervals to form a large tooth region. A plurality of medium teeth are arranged sequentially or at intervals to form a medium tooth region. A plurality of fine teeth are arranged sequentially or at intervals to form a fine tooth region. The large teeth, the medium teeth and the fine teeth are arranged sequentially or at intervals in the sequence of the large tooth region, the medium tooth region and the fine tooth region to form a group of mixed cutter teeth, wherein the group of cutter teeth is in the same section as the cutter head, and the sections of groups of mixed cutter teeth are arranged sequentially or at intervals in the sequence of the large tooth, the medium tooth and the fine tooth.

Alternatively, each group of mixed cutter teeth can be formed by combining any two of a large tooth, a medium tooth and a fine tooth, wherein the group of cutter teeth is in the same section as the cutter head, and the sections of groups of mixed cutter teeth are arranged sequentially or at intervals in the sequence of the cutter teeth forming the group of cutter teeth.

The large tooth region or the medium tooth region or the fine tooth region in each group of mixed cutter teeth is at least one.

Preferably, inclined angles between adjacent cutter teeth in the same group of cutter teeth are equal; each group of cutter teeth are in the same section as the cutter head; an inclined angle between the cutter teeth and the center of the cutter head is respectively $\alpha$, wherein an inclined angle between the large tooth and the center of the cutter head is $\alpha 3$; the angle of $\alpha 3$ is between 10° to 22°; an inclined angle between the medium tooth and the center of the cutter head is $\alpha 2$; the angle of $\alpha 2$ is between 12° to 30°; an inclined angle between the fine tooth and the center of the cutter head is $\alpha 1$; and the angle of $\alpha 1$ is between 8° to 16°.

Preferably, the cutter teeth forming the large tooth region, the medium tooth region and the fine tooth region are at least two.

Preferably, when the mixed cutter teeth comprise the large tooth region and the fine tooth region, each group of cutter teeth have three thick teeth and four fine teeth on the same section with the cutter head.

A highly efficient, anti-vibration, durable rotating file with variable pitch comprises a cutter head and a cutter handle, wherein the cutter head is connected with the cutter handle. The rotating file is characterized in that: multiple groups of cutter teeth are distributed on the cutter head; and the groups of cutter teeth are respectively a large tooth, group, a medium tooth group and a fine tooth group, wherein a plurality of large teeth are arranged sequentially to form the large tooth group.

A plurality of medium teeth are arranged sequentially to forum the medium tooth group.

A plurality of fine teeth are arranged sequentially to form the fine tooth group.

Meanwhile, the groups are arranged on the cutter head in parallel according to the arrangement mode of the large tooth group, the medium tooth group and the fine tooth group.

The group of cutter teeth is in the same section as the cutter head; and the sections of groups of mixed cutter teeth are arranged sequentially or at intervals in the sequence of the large tooth, the medium tooth and the fine tooth.

Alternatively, any two of the large tooth group, the medium tooth group and the fine tooth group are combined and arranged sequentially to form the groups of cutter teeth, wherein the groups of cutter teeth are in the same section as the cutter head, and the sections of each group of mixed cutter teeth are arranged sequentially or at intervals in the sequence of the cutter teeth forming the group of cutter teeth.

The large tooth or the medium tooth or the fine tooth in each group of mixed cutter teeth is at least one.

Preferably, the shape of the cutter head is any geometric and the connecting line of the top end of each group of cutter teeth is fitted with the shape of the cutter head.

Preferably, the cutter head is arc-shaped, planar, triangular, trapezoid, cylindrical, column-shaped ball head, spheri-cal, conical, conical round head, arc-shaped pointed head, arc-shaped round head, oval, torch-shaped, inverted cone and saw blade shape.

Preferably, an inclined angle of 0° to 90° is formed between each group of cutter teeth and the axial direction of the cutter handle, and the connecting line of each group of cutter teeth is a straight line.

In metallic and nonmetallic processing, the rotating file of the present invention can effectively restrain the cutting vibration, increase the feed rate of the cutter, simultaneously obtain highly efficient cutting and fine processing surface, and increase the service life of the cutter.

Figure 1:
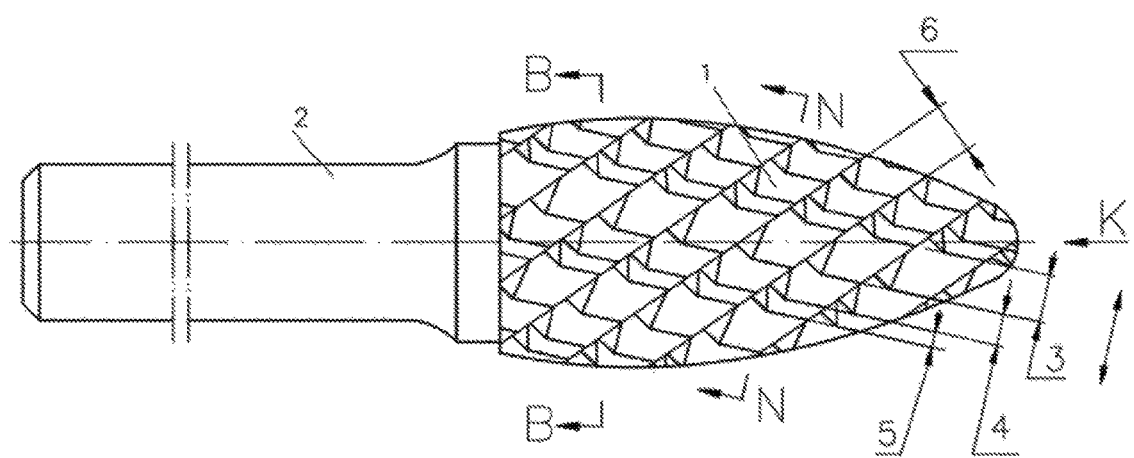
FIG. 1 is an entire schematic diagram of embodiment 1.
Figure 2:
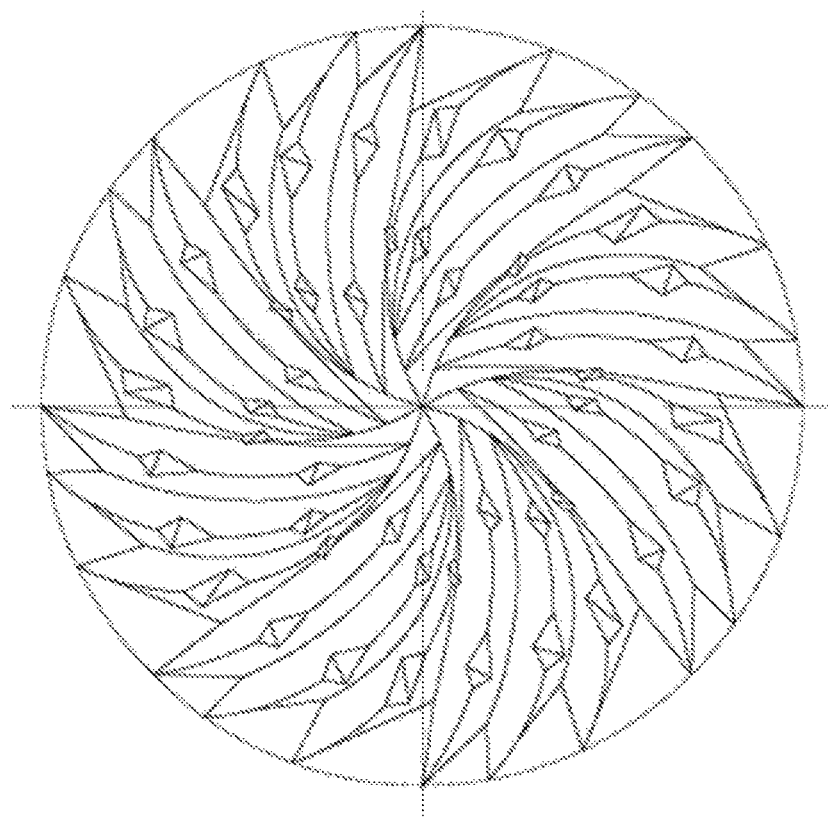
FIG. 2 is a K-direction schematic diagram in FIG. 1.
Figure 3:
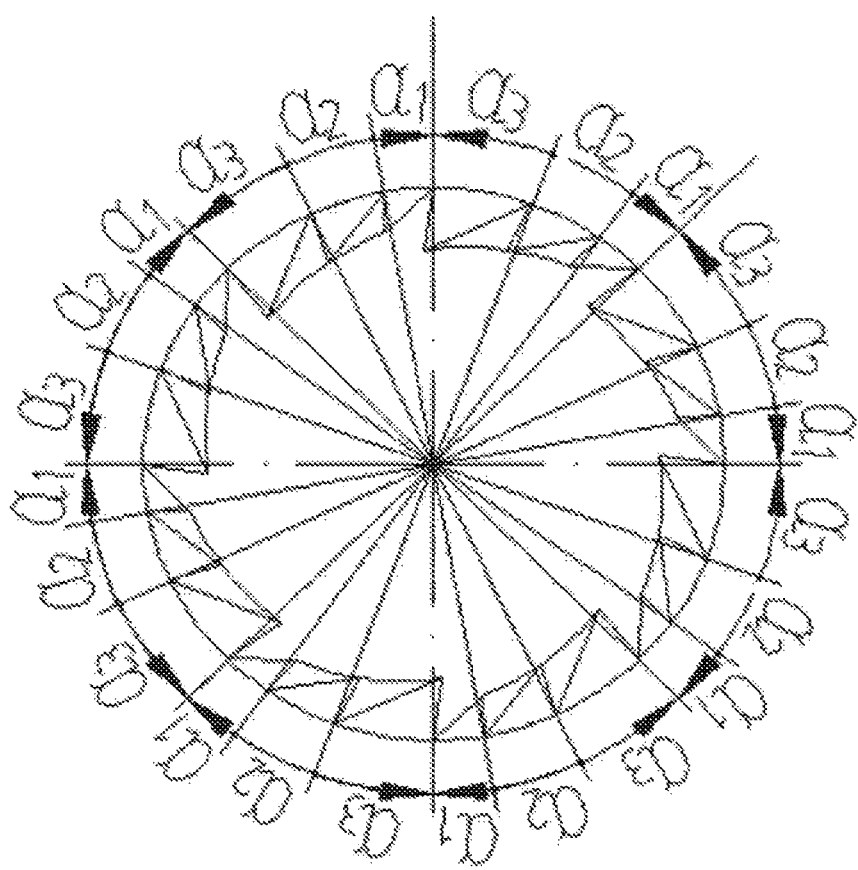
FIG. 3 is a B-B directional schematic diagram in FIG. 1.

Description of serial number in the figures: cutter head 1; cutter handle 2; large tooth 3; medium tooth 4; fine tooth 5 chip splitting tooth 6; large tooth region 3-1; and fine tooth region 5-1

DETAILED DESCRIPTION

The present invention is described in detail below in combination with the drawings.

In the prior art, the group of processing teeth is generally composed of a plurality of groups of processing teeth with the same processing precision. Such rotating file can only finish processing of one precision. Moreover, the pitch of each processing tooth is gradually decreased.

Embodiment 1

FIG. 1 to FIG. 4 are schematic diagrams of embodiment 1.

A highly efficient, anti-vibration, durable rotating file with variable pitch comprises a cutter head 1 and a cutter handle 2, wherein the cutter head 1 is connected with the cutter handle 2. The sectional shape of the cutter head can be any geometric, e.g., arc-shaped, circular and planar. The preferred shape of the cutter head is conic, cylindrical, etc. Of course, the cutter head is not limited to the arc-shaped structure, the circular structure and other structures, and can be cylindrical, cylindrical end teeth, column-shaped ball head, spherical, conical, conical round head, arc-shaped pointed head, arc-shaped round head, oval, torch shape, inverted cone, saw blade shape and various other shapes.

In the embodiment, the preferred sectional shape of the cutter head is circular. Multiple groups of cutter teeth are distributed on the cutter head; and each group of cutter teeth are mixed cutter teeth. Each group of mixed cutter teeth comprises a large tooth 3, a medium tooth 4 and a fine tooth 5. Each group of mixed cutter teeth on the cutter head are identical, wherein the large tooth, the medium tooth and the fine tooth are arranged sequentially or at intervals to form a group of mixed cutter teeth. For example, the arrangement mode of the combination of one group of mixed cutter teeth can be the large tooth, the medium tooth and the fine tooth, wherein the large tooth, the medium tooth and the fine tooth can be multiple, and the connecting line of the tops of the large tooth 3, the medium tooth 4 and the fine tooth 5 is concentric with the circle of the section of the cutter head.

Each group of cutter teeth is in the same section as the cutter head. An inclined angle between the cutter teeth and the center of the cutter head is respectively α, wherein an inclined angle between the large tooth and the center of the cutter head is α3; an inclined angle between the medium tooth and the center of the cutter head is α2; an inclined angle between the fine tooth and the center of the cutter head is α1; meanwhile, α1<α2<α3; and the angle of α is between 9° to 45°.

Because the cutter head with a circular sectional shape is selected, each group of processing teeth is generally spiraled on the circumference of the cutter head in the shape of a spiral line. Moreover, each spiral line is parallel. Therefore, an inclined angle of 0° to 90° is formed between each group of cutter teeth and the axial direction of the cutter handle, and the connecting line of each group of cutter teeth is a straight line.

When the cutter head is a planar structure, for example, when the cutter head is a cuboid structure, multiple groups of cutter teeth are respectively distributed on one or more planes of the cuboid. In the embodiment, each large tooth, each medium tooth and each fine tooth are arranged at a certain distance. The large tooth, the medium tooth and the fine tooth can be connected sequentially from head to tail. This is consistent with the single arrangement of the large tooth (medium tooth or fine tooth) on the cutter head in the prior art.

In brief, each group of mixed otter teeth in embodiment 1 can be made in this way: the large tooth-the medium tooth-the fine tooth/ . . . the large tooth-the medium tooth-the fine tooth/ . . . .

Figure 4:
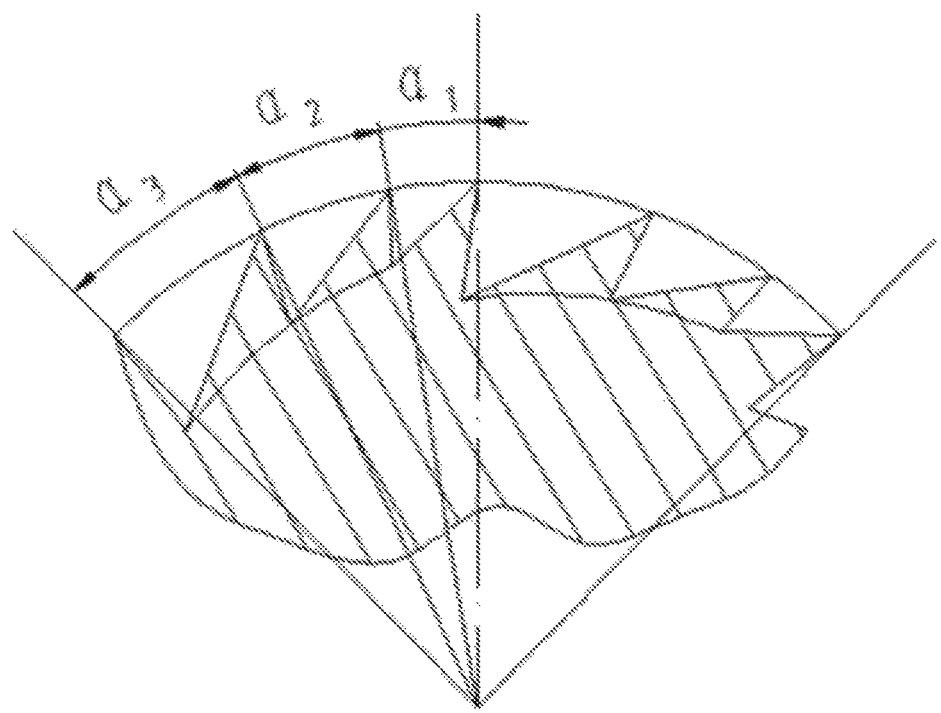
FIG. 4 is an enlarged schematic diagram of N-N direction in FIG. 1.
Figure 5:
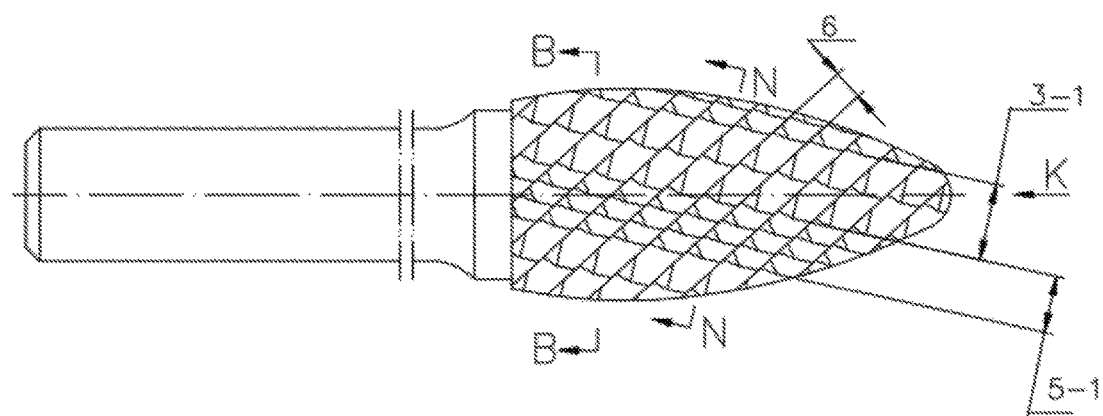
FIG. 5 is a main view of embodiment 2.
Figure 6:
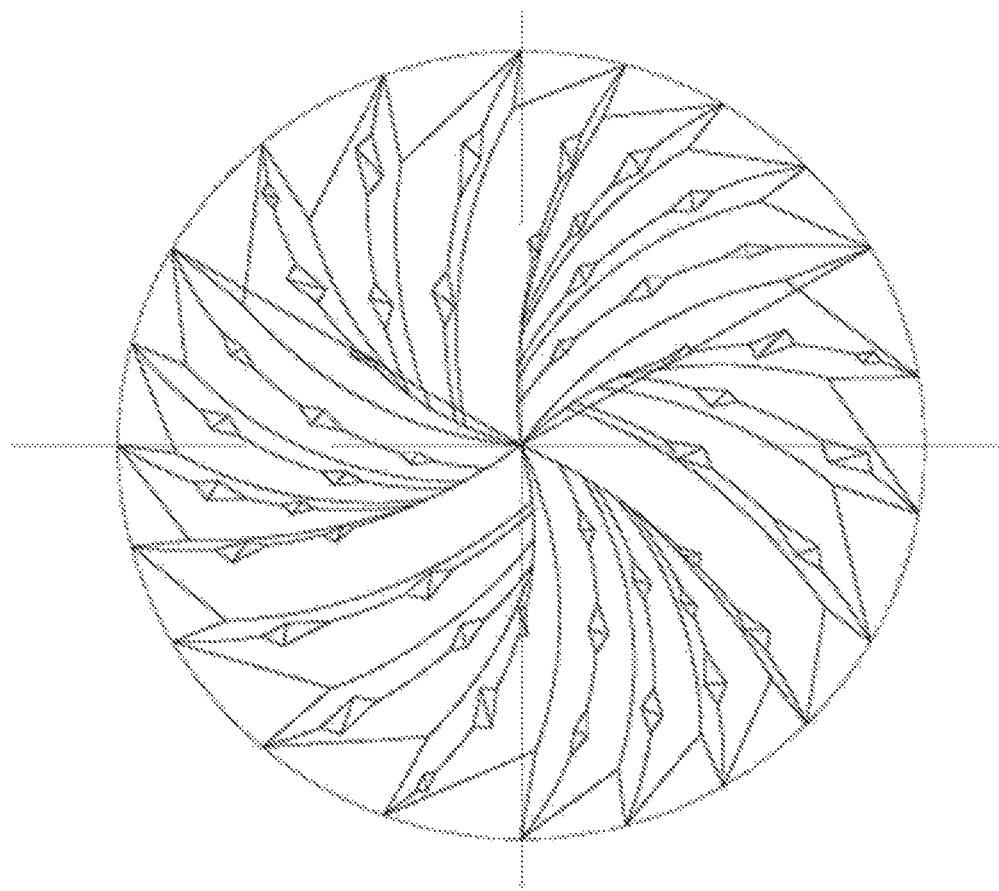
FIG. 6 is an enlarged schematic diagram of K direction in FIG. 5.

If A, B and C respectively represents the large tooth, the medium tooth and the fine tooth (as below), the arrangement mode of the cutter teeth on the circumferential section of the cutter head in the embodiment is A, B, C/A, B, C/ . . . , as shown in FIG. 4 and FIG. 5.

The number of teeth in each group can be adjusted according to the size of the cutter head (as below).

Embodiment 2

Embodiment 2 is different from embodiment 1 that the mixed cutter teeth can be the combination of any two of the large tooth, the medium tooth and the fine tooth to form a group of mixed cutter teeth. For example, a group of mixed cutter teeth are formed in the arrangement mode of the large tooth and the medium tooth, or the mixed cutter teeth are formed in the arrangement mode of the large tooth and the fine tooth or the medium tooth and the fine tooth. Of course, the large tooth, the medium tooth and the fine tooth in one group of mixed cutter teeth can be multiple.

In brief, each group of mixed cutter teeth in embodiment 2 can be made in this way: the large tooth-the medium tooth/the large tooth-the medium tooth/ . . . , i.e., A, B/A, B/ . . . .

Alternatively, the large tooth-the fine tooth/the large tooth-the fine tooth/ . . . , i.e., A, C-A, C/ . . . .

Alternatively, the medium tooth-the fine tooth/the medium tooth-the fine tooth/ . . . , i.e., B, C/B, C/ . . . .

A group of mixed cutter teeth formed in the combination sequence of the large tooth-the medium tooth/the large tooth-the medium tooth/ . . . are taken as an example, wherein the arrangement of the cutter teeth on the group of cutter teeth having the same section as the cutter head (i.e., circumferential direction) is also the large tooth-the medium tooth/the large tooth-the medium tooth/ . . . . That is, the arrangement sequence of the cutter teeth on the group of cutter teeth on the same circumferential section as the cutter head is consistent with the arrangement sequence of the cutter teeth forming the group of cutter teeth.

A group of mixed cutter teeth formed in the combination sequence of the medium tooth-the fine tooth/the medium tooth-the fine tooth/ . . . are taken as an example, wherein the arrangement of the cutter teeth on the group of cutter teeth having the same section as the cutter head (i.e., circumferential direction) is also the medium tooth-the fine tooth/the medium tooth-the fine tooth/ . . . .

The large tooth or the medium tooth or the fine tooth in each group of mixed cutter teeth is at least one.

Embodiment 3

FIG. 5 to FIG. 8 are schematic diagrams of embodiment 3. In the embodiment, the preferred sectional shape of the cutter head is still a circular arc-shaped structure.

Each group of cutter teeth in embodiment 3 can also be mixed cutter teeth. Each group of mixed cutter teeth in the embodiment comprise a plurality of large teeth, a plurality of medium teeth and a plurality of fine teeth, wherein a plurality of large teeth are arranged sequentially or at intervals to form the large tooth region; and a plurality of medium teeth are arranged sequentially or at intervals to form a medium tooth region. A plurality of fine teeth are arranged sequentially or at intervals to form a fine tooth region. The large teeth, the medium teeth and the fine teeth are arranged sequentially or at intervals in the sequence of the large tooth region, the medium tooth region and the fine tooth region to form a group of mixed cutter teeth. Alternatively, each group of mixed cutter teeth can be formed by combining any two of a large tooth, a medium tooth and a fine tooth.

The depth of the fine tooth in the embodiment is shallower (0.12 mm to 0.40 mm), the depth of the medium tooth is deep (0.25 mm to 0.58 mm) and the depth of the thick tooth is deeper (0.40 mm to 0.70 mm).

Inclined angles between adjacent cutter teeth in the same group of cutter teeth are equal; each group of cutter teeth are in the same section as the cutter head; an inclined angle between the cutter teeth and the center of the cutter head is respectively α, wherein an inclined angle between the large tooth and the center of the cutter head is α3; the angle of α3 is between 10° to 22°; an inclined angle between the medium tooth and the center of the cutter head is α2; the angle of α2 is between 12° to 30°; an inclined angle between the fine tooth and the center of the cutter head is α1; and the angle of α1 is between 8° to 16°.

The difference between the mixed cutter teeth in the embodiment and the mixed cutter teeth in embodiment 1 is only the selection number of each cutter tooth. For example, in each group, two large teeth, two medium teeth and two fine teeth are respectively selected. Identical cutter teeth are arranged to form respective corresponding cutter tooth regions (i.e., AA-BB-CC/AA-BB-CC/ . . . ), and then are arranged to form a group of mixed cutter teeth sequentially or at intervals in the arrangement mode of the large tooth region, the medium tooth region and the fine tooth region.

Taking FIG. 5 as an example, as shown in FIG. 5, two large teeth are preferably selected and arranged sequentially to form a large tooth region 3-1, and three fine teeth are arranged sequentially to form a fine tooth region 5-1. The large tooth region and the fine tooth region are connected from head to tail or at intervals to form a group of mixed cutter teeth, wherein the arrangement of the cutter teeth on the group of cutter teeth having the same section as the cutter head (i.e., circumferential direction) is also the large tooth region-the fine tooth region/the large tooth region-the fine tooth region/ . . . .

Figure 7:
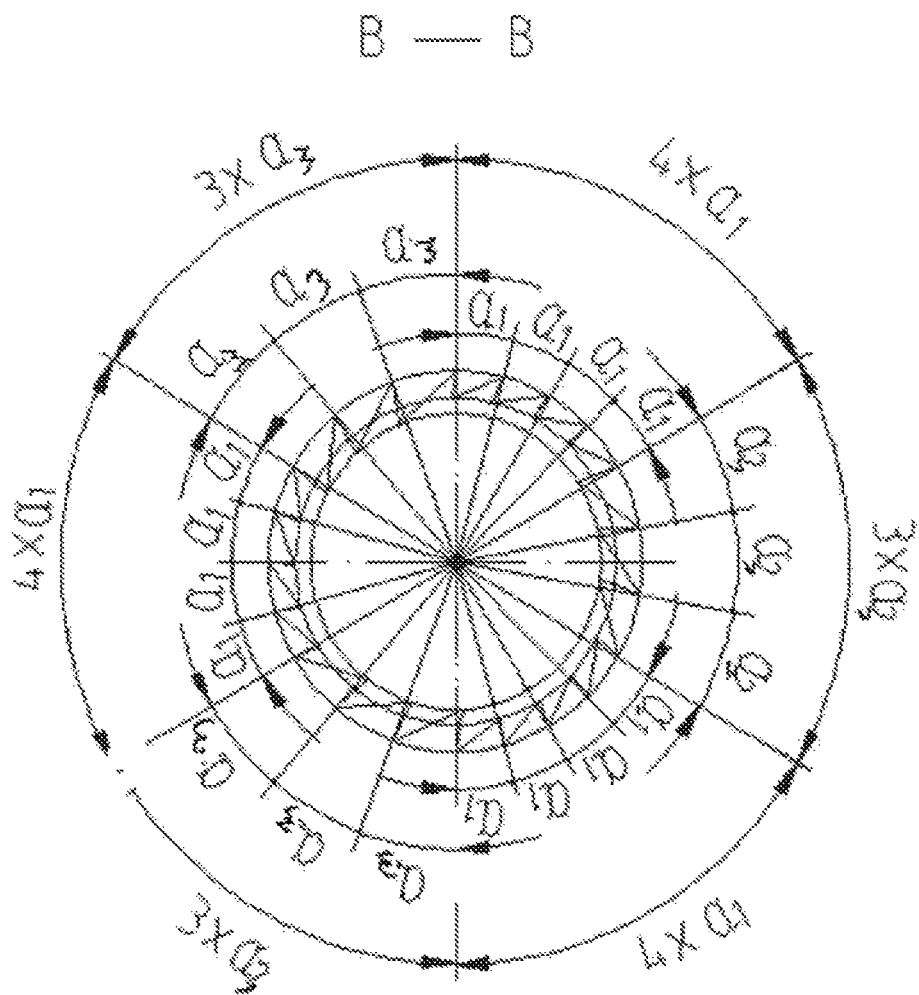
FIG. 7 is a circumferential schematic diagram in embodiment 2 when selecting four groups of fine teeth and three groups of large teeth.
Figure 8:
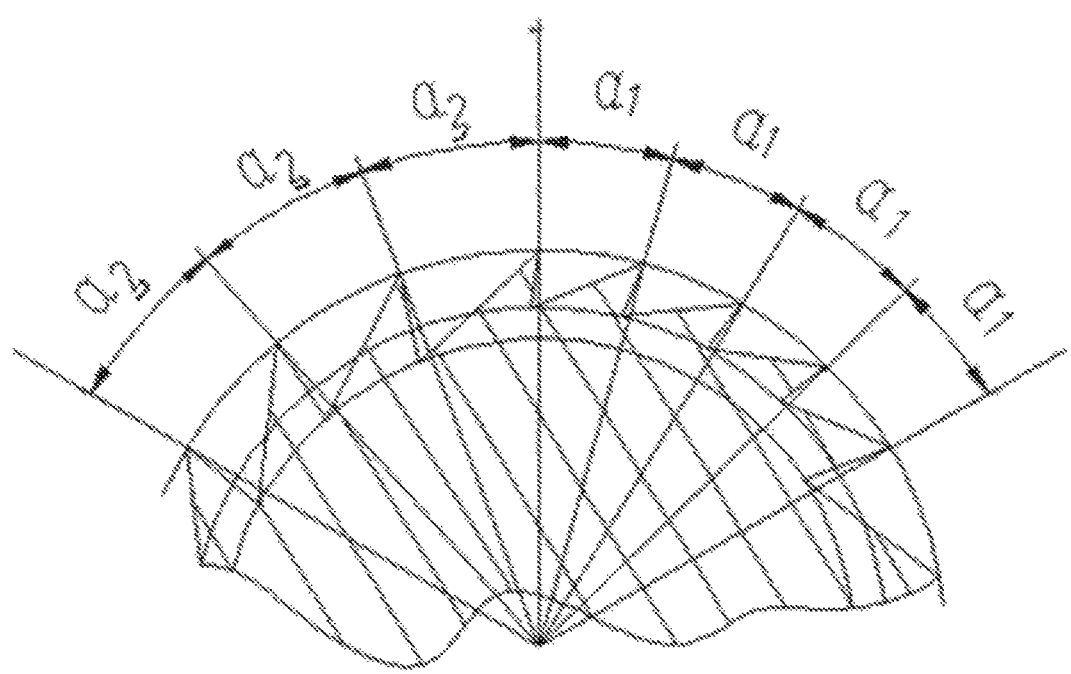
FIG. 8 is an enlarged schematic diagram of N-N direction in FIG. 7.

Taking the schematic structures of the circumferential sections of FIG. 7 and FIG. 8 as an example, three large teeth are preferably selected and arranged sequentially to form a large tooth region, and four fine teeth are arranged sequentially to form a fine tooth region. The large tooth region and the fine tooth region are connected from head to tail or at intervals to form a group of mixed cutter teeth, while on the circumferential section, the arrangement of the cutter teeth on the group of cutter teeth having the same section as the cutter head (i.e., circumferential direction) is also the large tooth region-the fine tooth region/the large tooth region-the fine tooth region/ . . . .

The large tooth region or the medium tooth region or the fine tooth region in each group of mixed cutter teeth is at least one.

Embodiment 4

Each of the groups of cutter teeth in the above several embodiments exists in the form of mixed cutter teeth, and shall be included in the scope of the present application regardless of the mixed form. Of course, each group of cutter teeth can be arranged after the combination of single cutter tooth. For example, multiple groups of cutter teeth are distributed on the cutter head, and the groups of cutter teeth are respectively a large tooth group, a medium tooth group and a fine tooth group, wherein a plurality of large teeth are arranged sequentially to form the large tooth group, a plurality of medium teeth are arranged sequentially to form the medium tooth group, and a plurality of fine teeth are arranged sequentially to form the fine tooth group.

Meanwhile, the groups are arranged on the cutter head in parallel according to the arrangement mode of the large tooth group, the medium tooth group and the fine tooth group.

The group of cutter teeth is in the same section as the cutter head; and the sections of groups of mixed cutter teeth are arranged sequentially or at intervals in the sequence of the large tooth, the medium tooth and the fine tooth.

Alternatively, any two or more of the large tooth group, the medium tooth group and the fine tooth group are combined and arranged sequentially to form the groups of cutter teeth, wherein the groups of cutter teeth are in the same section as the cutter head, and the sections of groups of mixed cutter teeth are arranged sequentially or at intervals in the sequence of any combination of the groups of cutter teeth.

The large tooth or the medium tooth or the fine tooth in each group of mixed cutter teeth is at least one.

No matter in which embodiment, in the utilization process of the present invention, the cutter tooth part is formed by arranging and distributing multiple cutter teeth of which the pitch and the tooth depth are periodically changed regularly at intervals on the circumferential surface of the rotating file head body. The circumferential cutter teeth on the head of the rotating file with variable pitch have pitch and tooth depth periodically changed regularly, thereby changing impact rhythm during work, effectively restraining periodic resonance, greatly reducing cutting vibration, enabling a cutter to realize stable cutting to the maximum extent and increasing the service life of the cutter and the surface finish of a processed workpiece.

The cutter teeth with a large pitch in the circumferential cutter teeth on the head of the rotating file have a larger chip groove which supports large-allowance cutting, better remove chips and increase processing speed. However, the cutter teeth with a smaller pitch have smaller tooth depth and better strength, can process harder material, simultaneously perform the function of gradual fine processing and can gradually polish a processed surface, thereby obtaining a bright and clean processed surface. The cutter teeth with variable pitch have the characteristics of a single thick tooth, a single medium tooth and a single fine tooth, thereby increasing the feed rate of the cutter. A fine processed surface is obtained while performing large-allowance cutting. Therefore, the operation is more convenient and smoother; the processing effect is more excellent; and the application is more effective.

The above is preferred embodiments of the present invention, not used for limiting the embodiments of the present invention. Any modification, equivalent replacement and improvement made within the spirit and the principle of the embodiments of the present invention shall be contained within the protection scope of the embodiments of the present invention.

I claim:

1. A rotary burs with variable pitch, comprising:
   a cutter head and a cutter handle;
   wherein the cutter head is connected with the cutter handle; multiple groups of cutter teeth are distributed on the cutter head; each group of the cutter teeth are spiraled on the circumference of the cutter head in the shape of a spiral line;
   each group of cutter teeth are mixed cutter teeth; the mixed cutter teeth comprise a large tooth, a medium tooth and a fine tooth;
   wherein the large tooth, the medium tooth and the fine tooth are arranged sequentially in an order of the large tooth-the medium tooth-the fine tooth or at intervals to form a group of the mixed cutter teeth;
   wherein a sequential order of the large tooth, the medium tooth and the fine tooth in each group of the mixed cutter teeth spiraling on the circumference of the cutter head is same;
   wherein the large tooth or the medium tooth or the fine tooth in each group of mixed cutter teeth is at least one; and
   an inclined angle of 0° to 90° is formed between each group of cutter teeth and the axial direction of the cutter handle, and the connecting line of each group of the cutter teeth is a straight line.

2. The rotary burs of claim 1, wherein an inclined angle between the cutter teeth and the center of the cutter head is respectively $\alpha$, wherein an inclined angle between the large tooth and the center of the cutter head is $\alpha_3$; an inclined angle between the medium tooth and the center of the cutter head is $\alpha_2$; an inclined angle between the fine tooth and the center of the cutter head is $\alpha_1$; meanwhile, $\alpha_1 < \alpha_2 < \alpha_3$; and the angle of $\alpha$ is between 9° to 45°.

3. The rotary burs of claim 1, wherein the shape of the cutter head is any geometric, and the peripheral contours of each group of the cutter teeth forms the geometric shape of the cutter head.

4. The rotary burs of claim 1, wherein the angle of $\alpha_3$ ranges from 10° to 22°; the angle of $\alpha_2$ is between 12° to 30°; and the angle of $\alpha_1$ is between 8° to 16°.

5. A rotary burs with variable pitch, comprising:
a cutter head and a cutter handle;
wherein the cutter head is connected with the cutter handle; multiple groups of cutter teeth are distributed on the cutter head; each group of the cutter teeth are spiraled on the circumference of the cutter head in the shape of a spiral line;
each group of cutter teeth are mixed cutter teeth; the mixed cutter teeth comprise any two of a large tooth, a medium tooth and a fine tooth;
wherein a sequential order of the large tooth, the medium tooth or the fine tooth in each group of the mixed cutter teeth spiraling on the circumference of the cutter head is same;
wherein the large tooth or the medium tooth or the fine tooth in each group of mixed cutter teeth is at least one; and
an inclined angle of 0° to 90° is formed between each group of cutter teeth and the axial direction of the cutter handle, and the connecting line of each group of the cutter teeth is a straight line.

\* \* \* \* \*